United States Patent
Russell et al.

[11] Patent Number: 6,122,091
[45] Date of Patent: Sep. 19, 2000

[54] TRANSMISSIVE SURFACE PLASMON LIGHT VALVE

[75] Inventors: Stephen D. Russell; Randy L. Shimabukuro, both of San Diego; Yu Wang, Pasadena, all of Calif.

[73] Assignee: California Institute of Technology, Pasadena, Calif.

[21] Appl. No.: 09/172,581

[22] Filed: Oct. 14, 1998

Related U.S. Application Data

[60] Provisional application No. 60/062,110, Oct. 14, 1997.

[51] Int. Cl.⁷ .................................................. G02F 1/03
[52] U.S. Cl. ............................ 359/245; 345/84; 348/744
[58] Field of Search .................................. 359/245, 247, 359/248, 263; 348/744; 345/1, 84, 88

[56] References Cited

U.S. PATENT DOCUMENTS

| | | | |
|---|---|---|---|
| 5,075,796 | 12/1991 | Schildkraut et al. | 359/247 |
| 5,157,537 | 10/1992 | Rosenblatt | 359/245 |
| 5,337,183 | 8/1994 | Rosenblatt | 359/248 |
| 5,570,139 | 10/1996 | Wang | 348/744 |
| 5,625,729 | 4/1997 | Brown | 385/31 |
| 5,729,641 | 3/1998 | Chandonnet et al. | 385/2 |

*Primary Examiner*—Loha Ben
*Attorney, Agent, or Firm*—Fish & Richardson P.C.

[57] ABSTRACT

A surface plasmon device that operates in a transmissive mode. The light is coupled through optically transparent layers to a surface plasmon which alters the color of the light.

10 Claims, 2 Drawing Sheets

TRANSMISSIVE SURFACE PLASMON LIGHT VALVE

CROSS REFERENCE TO RELATED APPLICATIONS

This application claims the benefit of the U.S. Provisional Application No. 60/062,110, filed on Oct. 14, 1997, which is incorporated herein by reference.

STATEMENT AS TO FEDERALLY SPONSORED RESEARCH

This invention was made with government fund. The U.S. government may have rights to this invention.

The invention described herein was made in the performance of work under a NASA contract, and is subject to the provisions of Public Law 96-517 (35 U.S.C. 202) in which the Contractor has elected to retain title.

BACKGROUND

Use of plasmons to effect color is described in U.S. Pat. No. 5,570,139, by a common inventor (Yu Wang), as well as other publications, by Wang, including "Voltage-Induced Color Selective Absorption with Surface Plasmons," Applied Physics Letters, Volume 67, No. 19, Nov. 6, 1995, pp. 2759–2761. These publications describe voltage-induced color selective absorption at a metal liquid crystal interface of surface plasmons. Briefly stated, a surface plasmon is a collective excitation of electrons which absorbs all incident light at its plasmon resonance frequency. This incident P-polarized light is absorbed at the surface plasmon resonance. The reflected light is the complementary color to the resonance. The above-discussed publications teach using a liquid crystal whose dieletrical constant varies with applied voltage. This changes the resonance frequency of the surface plasmon and hence provides a corresponding change in absorption. If a voltage is used to change the dielectric constant of a liquid crystal, the reflected light will also show that color change.

The typical mode of operation described in these prior references is, as described above, reflective.

SUMMARY OF THE INVENTION

The present disclosure describes a transmissive, rather than reflective, system. The present disclosure as described herein describes a surface plasmon light valve where the plasmon color-changed light continues in the same direction as the incident radiation. Hence, the transmissive light production mode allows different modes of operation which are not possible using reflective modes.

BRIEF DESCRIPTION OF THE DRAWING

These and other aspects will be described in detail with reference to the accompanying drawings, wherein.

DESCRIPTION OF THE PREFERRED EMBODIMENTS

Figure 1:
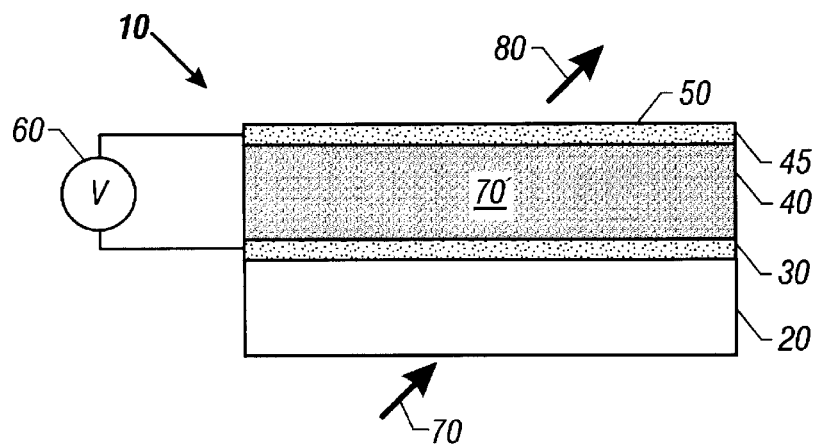
FIG. 1 shows a first embodiment of a transmissive plasmon light valve.

The first embodiment is shown schematically in FIG. 1. The system is formed of a light valve 10 which has a transparent substrate 20 at its top surface. A bottom electrode 30 is attached to the transparent substrate 20. Electro-optic material 40 is coupled to the bottom electrode 30, covered by a top electrode 50. All of the materials are at least partly transparent to electromagnetic radiation.

Electrode 50 also has a characteristic allowing its optical properties to be modified by suitable modulation of the electrical bias across the electrode. In this system, an electrical bias is provided by a voltage source 60 that is connected between the bottom electrode 30 and the top electrode 50.

The FIG. 1 embodiment receives incident electromagnetic radiation 70. This example assumes that the electromagnetic radiation is visible light. This visible light is at least partly transmitted through transparent substrate 20.

The transparent substrate 20 may be formed of any optically transmissive media, including SF-57 glass, quartz, fused silica, sapphire, yttria-stabilized zirconia, magnesium fluoride, diamond, or other materials.

Similarly, the bottom electrode and the electro-optic material are optically transparent. Therefore, the electromagnetic energy is partly transmitted through these materials and impinges on an interface 45 between the electro-optic material 40 and the top electrode 50. The electrodes 30 and 50 are preferably formed of transparent or semi-transparent conductive materials such as indium tin oxide (ITO), tin oxide, refractory metal silicides, optically thin metals, or the like.

A component of the electromagnetic energy 70' is absorbed at the resonance frequency of the surface plasmon formed at the interface 45 between the electro-optic material 40 and the top electrode 50. Hence, the transmitted electromagnetic energy 80 differs from the electromagnetic energy 70 based on the amount and kind of energy which has been absorbed. The resonance frequency, which determines the amount of energy that is absorbed, is determined by the optical constants of the electro-optic material 40, the top electrode 50, the applied voltage 60, and the physical structure of the light valve. Hence, the electromagnetic radiation 80 is color-adjusted by the plasmon light valve and the light passes completely through the device.

Figure 2A:
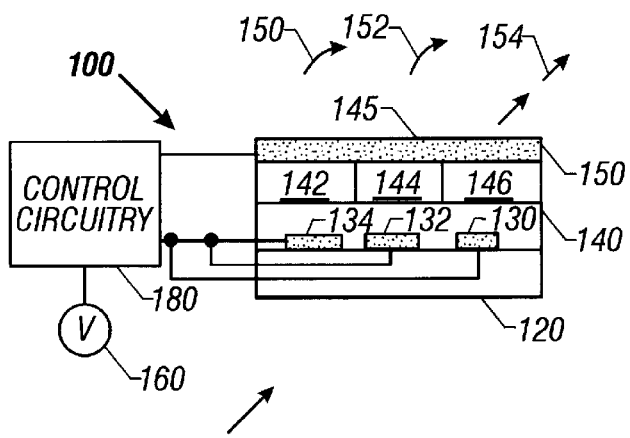
FIGS. 2A–2C show various aspects of a second embodiment with a plurality of electrodes defining different areas in the light valve.
Figure 2C:
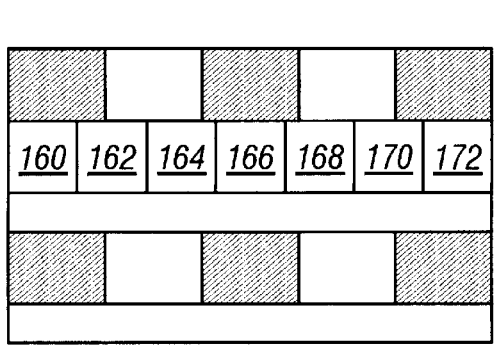
Figure 2B:
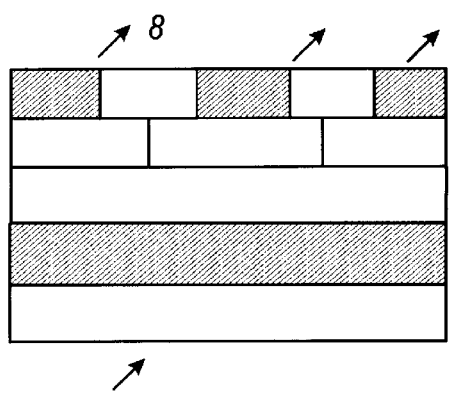

Alternative embodiments using the same general structure are shown in FIGS. 2A–2C. In FIGS. 2A and 2C, there are a plurality of bottom electrodes 130, 132, 134. Each is formed in a similar way and using similar materials to the bottom electrode 30 in the first embodiment. Each are formed on a transparent substrate 20. Separate biases are provided to each of the electrodes. This allows spatially modulating the resonant frequency of the surface plasmon at different areas of the interface 45 between the electro-optic material and top electrode 50.

Control circuitry 180 allows separately controlling the bias potential to each of the electrodes 130, 132, 134. Hence, each of these areas 142, 144, 146 adjacent those electrodes can be separately controlled. This forms a pixilated system whereby each of the areas can be controlled to produce a different color, thereby producing three differently-colored output beams 150, 152, 154.

FIG. 2B shows an alternative configuration using a plurality of separated top electrodes 150.

Yet another embodiment shown in FIG. 2C uses separated top electrodes and separated bottom electrodes. Electrodes may be configured aligned with one another, or non-aligned in relative spacing. Non-aligned electrodes allow even more areas of different color. FIG. 2C shows the different plasmon areas 160, 162, 164, 168, 170, 172 caused by different biases from different amounts of overlap. Each area can have separate characteristics.

Figure 3:
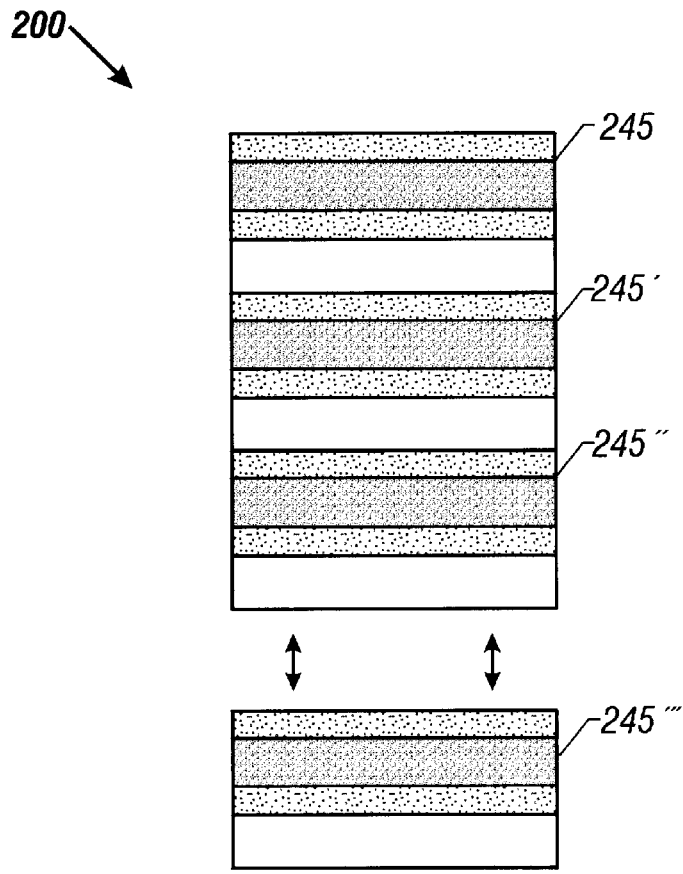
FIG. 3 shows a concatenation embodiment which uses a plurality of layers.

FIG. 3 shows another embodiment which includes a plurality of concatenated transmissive surface plasmon light valves 200. The applied voltages are selected to control a plurality of surface plasmon absorptions at the interfaces 245, 245', 245", and 245'". The valves are optically coupled to one another, but need not be physically coupled. So long as optical radiation can be coupled between each two adjacent valves, a multiple layer system can be used.

Each of the valves in FIG. 3 can be separately controlled, allowing even more control over pixels.

Figure 4:
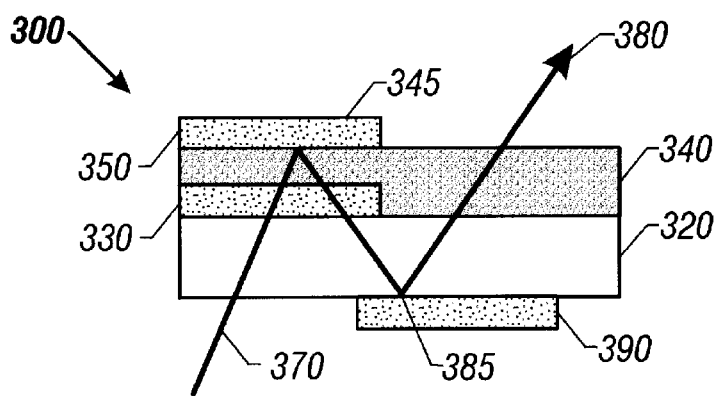
FIG. 4 shows a plurality of reflective type systems collectively operating as a transmissive system.

FIG. 4 shows another embodiment which uses two, coupled, reflective plasmon light valves. A transparent substrate 320 allows the electromagnetic radiation 370 to pass therethrough. The radiation also passes through the bottom electrode 330, the electro-optic material 340, and the top electrode 350. Top electrode 350 is reflective rather than being transmissive, making this system much like previous reflective systems. A component of the electromagnetic energy is absorbed at the resonance frequency of the plasmon of the interface 345. The non-absorbed light is reflected to the second interface 385 and is again reflected. This forms twice-reflected electromagnetic energy 380, that is traveling in the same direction as the original energy, but acts like a transmissive device.

The layers 390 can be either a second plasmon device, but more preferably is a highly reflective material such as aluminum, gold or a dielectric stack designed for high reflectivity.

As in the other systems, a voltage is applied between the top electrode and the bottom electrode to control the surface plasmon resonance condition. This embodiment, and the embodiment of FIG. 3, can also be used with the separated electrode embodiments of FIGS. 2A–2C.

The disclosed techniques provide a new mode of operation for surface plasmon devices. This mode is transmissive, that is the altered light continues travelling in the same direction as the original light. This allows new applications for the technology, for example as a voltage-selective optical filter which can be optically coupled to any optical detector, e.g. a charge-coupled device, charge-injection device, photodiode, photomultiplier tube, and the like.

The disclosed embodiment also allows for ease in concatenating the device and forming a plurality of devices providing for use of multiple surface plasmon absorption resonances which can control both gray scale and color of the transmitted light.

The fabrication of the transmissive surface plasmon light valve of the current system also provides for compatibility for monolithic integration with silicon-on-sapphire (SOS) or silicon-on-quartz (SOQ) advanced microelectronic technology (NMOS, PMOS and CMOS) for integrated control circuitry, electrical addressing, system interfacing, and the like. SOS, for example, is a proven technology for large scale integrated circuitry. It has several distinct advantages over bulk silicon for high speed, radiation hardened, high temperature, cryogenic temperature, wireless communications and other various applications. In electronic circuits SOS has intrinsically lower parasitic capacitances and provides better device isolation. It can be thinned to yield vertically scaled dimensions facilitating horizontal scaling of submicron devices.

The use of the sapphire substrate offers: excellent dielectric isolation, thermal conductivity, transparency, rigidity, flatness, hardness, and resistance to chemicals.

Although only a few embodiments have been described in detail above, other embodiments are contemplated by the inventor and are intended to be encompassed within the following claims. In addition, other modifications are contemplated and are also intended to be covered.

What is claimed is:

1. A plasmon light valve, comprising:
   a layer of electro-optic material which is at least partially transparent,
   top and bottom bias electrodes which have substantially planar surfaces, coupled to said electro-optic material, said bias electrodes also being at least partly optically transparent, and applying a bias to said electro-optic material which is effective to form a surface plasmon resonance of a type which affects light, said surface plasmon resonance affecting some aspect of light passing through said electro-optic material.

2. A system as in claim 1 wherein at least one of said bias electrodes is separated into a plurality of separated electrodes.

3. A system as in claim 2 wherein the bottom electrode is separated.

4. A system as in claim 3 wherein said top electrode is also separated.

5. A system as in claim 2 wherein the top electrode is separated.

6. An apparatus as in claim 1 further comprising additional layers of electro-optic materials sandwiched between additional optically transparent electrodes.

7. A system as in claim 1 wherein the top electrode includes a reflective portion, and further comprising a second reflective portion reflecting the light to pass in the same direction as the incoming light.

8. A method of coloring light, comprising:
   obtaining incoming light traveling in a first direction;
   exposing said incoming light to a surface plasmon resonance; and
   outputting said input light in a similar direction to that in which it was originally traveling.

9. A method as in claim 8, wherein said exposing comprises passing said incoming light through an optically transparent substrate, and an optically transparent electrode.

10. A method as in claim 8, further comprising reflecting said light in a second direction after said exposing, and then again reflecting said light back to said first direction.

* * * * *